106. COMPOSITIONS, COATING OR PLASTIC.
84

Cross Reference

H. E. BOARDMAN.
PREPARED ROOFING.
APPLICATION FILED NOV. 2, 1915.

1,190,505.

1,190,505.

Patented July 11, 1916.

117-32

Inventor:
Harold E. Boardman
By Gillson & Gillson
Attys.

UNITED STATES PATENT OFFICE.

HAROLD E. BOARDMAN, OF MEDFORD, MASSACHUSETTS.

PREPARED ROOFING.

1,190,505.  Specification of Letters Patent.  Patented July 11, 1916.

Application filed November 2, 1915. Serial No. 59,209.

*To all whom it may concern:*

Be it known that I, HAROLD E. BOARDMAN, a citizen of the United States, and resident of Medford, county of Middlesex, and State of Massachusetts, have invented certain new and useful Improvements in Prepared Roofing, of which the following is a specification and which are illustrated in the accompanying drawings, forming a part thereof.

The invention relates to prepared roofings which comprise a waterproof body layer and a protective and ornamental grit surface layer. The grit employed for the surface layer of prepared roofings of this type has heretofore been derived either from mineral substances having the requisite hardness or from waste products of similar character. In some instances the grit is obtained by screening alone. More frequently, however, crushing is first required. In either case there is an objectionable variation in the size and shape of the particles obtained and difficulty is always experienced in removing the last traces of dust. This dust is objectionable both because it interferes with the proper adhesion of the particles to the roof material and because it forms a thin coating upon the surface of each particle of grit and prevents the true color of the particles being shown. Furthermore, the said mineral substances and waste products are not obtainable in some of the colors which are particularly desirable for roof surfacing materials and while artificial coloring has been proposed, the operations incident thereto are expensive and the colors obtained are applied only to the surface of the particles and are generally not sufficiently permanent upon exposure to the weather.

The present invention accordingly contemplates the use of an artificially prepared grit which is free from dust and in which the size, shape and color of the particles is definitely controlled, as by molding the particles from a plastic mass.

The object of the invention is to provide a prepared roofing having a grit surface of improved appearance and weather resisting properties.

Figure 1:
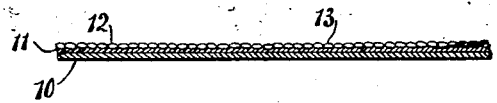
Figure 2:
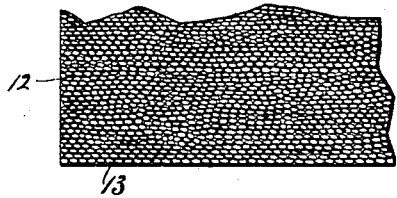
Figure 3:
Figure 4:
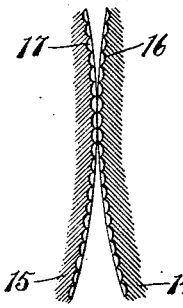

In the accompanying drawings, Figure 1 is a detail sectional view, showing a form of prepared roofing embodying the improvement provided by the invention, Fig. 2 is a detail plan view of the same, Fig. 3 is a side elevation showing the preferred form of a single particle of the grit surfacing material, greatly enlarged, and Fig. 4 is a detail sectional view showing a form of rollers which may be employed for molding the particles of grit surfacing material.

In producing the improved prepared roofing, a body or foundation layer 10 may be provided and this layer 10 is preferably rendered adhesive upon one side, as by the application thereto of a layer 11 of material which is softened by heat. While the invention is not limited with reference to the particular character of the body layer 10, this layer may comprise a sheet of well known roofing felt rendered waterproof by being saturated with asphalt. The layer 11 will then be conveniently composed of asphalt of such consistency as to be soft when moderately heated.

The improved prepared roofing also comprises the fire proof and weather resisting grit surface layer 12. This last mentioned layer is formed by covering the adhesive layer 11 with hardened particles 13, while the adhesive layer 11 is still soft. If desired, the particles 13 may be forced into intimate contact with the adhesive layer 11, as by passing the completed sheet between pressure rolls.

The particles 13 are preferably of uniform size and shape and will usually be of an attractive red or green color. These particles are most conveniently prepared by being molded from a plastic compound and then hardened by heat. A suitable plastic compound for this purpose is produced by mixing powdered talc with fluid silicate of soda, a dye or a pigment, as oxid of iron, being added to the compound when the particles are to be colored throughout. To provide for the molding of the particles in large quantities, at small expense, the plastic mass may be passed between rolls, as 14, 15, which have registering depressions 16, 17, formed in their contacting surfaces in such numbers that closely related depressions extend over the entire surface of each roll. This operation will usually serve for the complete separation of the plastic mass into a quantity of the particles, as 13, or the mass may be formed into a sheet in which the particles adhere together but in such manner as to be readily broken apart.

While the particles 13 may take any molded shape, the weight of the quantity of particles required for the production of a given area of the grit surface layer 12 will be relatively small if the particles are somewhat flattened. As shown, each particle 13 is molded in the form of an oblate spheroid having a short axis as compared with its diameter. In this case the depressions 16, 17, are relatively shallow and each depression substantially conforms, in shape, with one half of the full form of a single particle 13.

The hardening of the molded particles 13 may be accomplished by baking at about the temperature of a low red heat. However, this hardening of the particles is facilitated if a quantity of water absorbent material, as for example, Portland cement, is included in the said plastic mass.

The molding of the particles 13 from a plastic mass entirely eliminates the formation of dust. Each particle accordingly presents a clear surface showing its true color and no fine material is present to interfere with the adhesion of the particles to the asphalt layer 11. Furthermore, the materials employed in the production of the plastic mass are inexpensive and, as a wide range of pigments may be employed, a variety of colors are obtainable in the finished roofing.

I claim as my invention,—

1. A grit surface prepared roofing having its said grit surface composed of artificially prepared hard spheroidal particles of uniform size.

2. A grit surface prepared roofing having its said grit surface composed of hardened particles molded from a plastic mass consisting of a mixture of silicate of soda and a powdered substance containing silica.

3. A grit surface prepared roofing having its said grit surface composed of hardened particles molded from a plastic mass consisting of a mixture of silicate of soda a powdered substance containing silica and a pigment.

4. A grit surface prepared roofing having its said grit surface composed of hardened particles molded from a plastic mass consisting of a mixture of silicate of soda and powdered talc.

5. A grit surface prepared roofing having its said grit surface composed of hardened particles molded from a plastic mass consisting of a mixture of silicate of soda, powdered talc and a pigment.

6. A grit surface prepared roofing having its said grit surface composed of molded particles of regulated size and reduced thickness as compared with their length and breadth.

HAROLD E. BOARDMAN.

Copies of this patent may be obtained for five cents each, by addressing the "Commissioner of Patents, Washington, D. C."